(12) United States Patent
Filachek et al.

(10) Patent No.: US 9,087,153 B2
(45) Date of Patent: Jul. 21, 2015

(54) CODE COVERAGE FRAMEWORK

(75) Inventors: Christopher D. Filachek, Lagrangeville, NY (US); Mei Hui Wang, Brookfield, CT (US); Joshua B. Wisniewski, Elizaville, NY (US)

(73) Assignee: International Business Machines Corporation, Armonk, NY (US)

( * ) Notice: Subject to any disclaimer, the term of this patent is extended or adjusted under 35 U.S.C. 154(b) by 580 days.

(21) Appl. No.: 13/289,141

(22) Filed: Nov. 4, 2011

(65) Prior Publication Data

US 2013/0117542 A1 May 9, 2013

(51) Int. Cl.
G06F 9/44 (2006.01)
G06F 11/36 (2006.01)
G06F 9/30 (2006.01)
G06F 9/48 (2006.01)

(52) U.S. Cl.
CPC ........ *G06F 11/3636* (2013.01); *G06F 9/30145* (2013.01); *G06F 9/4881* (2013.01)

(58) Field of Classification Search
USPC .................. 717/124, 158, 127–128; 715/709; 714/4; 718/108
IPC ....... G06F 11/3466,11/3612, 11/3471, 11/3636, G06F 11/323; F06F 2201/88, 2201/86, 2261/865
See application file for complete search history.

(56) References Cited

U.S. PATENT DOCUMENTS

| | | | |
|---|---|---|---|
| 6,018,759 A * | 1/2000 | Doing et al. .................. 718/108 |
| 6,041,406 A | 3/2000 | Mann | |
| 6,427,232 B1 | 7/2002 | Ku et al. | |
| 6,721,941 B1 * | 4/2004 | Morshed et al. ............... 717/127 |
| 6,728,949 B1 * | 4/2004 | Bryant et al. .................. 717/127 |
| 6,961,928 B2 | 11/2005 | Aarts et al. | |
| 7,100,152 B1 | 8/2006 | Birum et al. | |
| 7,302,677 B2 | 11/2007 | Reissman et al. | |
| 7,386,839 B1 | 6/2008 | Golender et al. | |
| 7,464,373 B1 | 12/2008 | Yunt et al. | |
| 7,596,778 B2 | 9/2009 | Kolawa et al. | |
| 7,661,094 B2 | 2/2010 | Blevin et al. | |
| 7,739,667 B2 | 6/2010 | Callahan, II et al. | |
| 7,774,172 B1 | 8/2010 | Yunt et al. | |
| 7,774,757 B1 | 8/2010 | Awasthi et al. | |
| 7,979,847 B2 | 7/2011 | Danton et al. | |
| 8,015,552 B1 | 9/2011 | Lindahl et al. | |
| 8,024,708 B2 | 9/2011 | Demetriou et al. | |
| 8,079,018 B2 | 12/2011 | Huene et al. | |

(Continued)

OTHER PUBLICATIONS

Tran, A., et al., "A Hardware-Assisted Tool for Fast, Full Code Coverage Analysis," IEEE Computer Society, 19th International Symposium on Reliability Engineering, Copyright 2008 IEEE, 1071-9458/08. DOI 10.1109/ISSRE.2008.22.

(Continued)

*Primary Examiner* — Tuan Vu
(74) *Attorney, Agent, or Firm* — Fleit Gibbons Gutman Bongini & Bianco PL; Jose Gutman

(57) ABSTRACT

A method, information processing system, and computer program product record an execution of a program instruction. A determination is made that a thread has entered a program unit. Another determination is made that that the thread is associated with at least one attribute that matches a set of thread recording criteria. An instruction recording mechanism for the thread is dynamically activated in response to the at least one attribute of the thread matching the set of thread recording criteria.

9 Claims, 9 Drawing Sheets

(56) References Cited

U.S. PATENT DOCUMENTS

| | | | |
|---|---|---|---|
| 8,156,476 B2 | 4/2012 | Maybee et al. | |
| 8,171,457 B2 | 5/2012 | Dimpsey et al. | |
| 8,276,123 B1 | 9/2012 | Deng et al. | |
| 8,370,811 B2 | 2/2013 | Grechanik et al. | |
| 8,429,617 B2 | 4/2013 | Demetriou et al. | |
| 8,479,161 B2 | 7/2013 | Weigert | |
| 8,490,067 B2 | 7/2013 | Boettcher et al. | |
| 8,499,287 B2 | 7/2013 | Shafi et al. | |
| 8,572,573 B2 | 10/2013 | Baliga et al. | |
| 8,607,198 B2 | 12/2013 | Nir-Buchbinder et al. | |
| 8,776,025 B2 | 7/2014 | Wisniewski | |
| 8,782,611 B1 | 7/2014 | Kretzler et al. | |
| 8,863,091 B2 | 10/2014 | Dageville et al. | |
| 2002/0087949 A1* | 7/2002 | Golender et al. | 717/124 |
| 2004/0123274 A1* | 6/2004 | Inagaki et al. | 717/128 |
| 2004/0158819 A1* | 8/2004 | Cuomo et al. | 717/128 |
| 2005/0155026 A1* | 7/2005 | DeWitt et al. | 717/158 |
| 2007/0083813 A1* | 4/2007 | Lui et al. | 715/709 |
| 2008/0307391 A1 | 12/2008 | Goel | |
| 2009/0089756 A1 | 4/2009 | Danton et al. | |
| 2009/0276658 A1* | 11/2009 | Lind et al. | 714/4 |
| 2009/0313607 A1 | 12/2009 | Harding et al. | |
| 2011/0047532 A1 | 2/2011 | Wang | |

OTHER PUBLICATIONS

Non-Final Rejection dated Oct. 21, 2013 received for U.S. Appl. No. 13/289,157.

Notice of Allowance dated Feb. 24, 2014 received for U.S. Appl. No. 13/289,157.

Makarov, D., et al., "Jikes RDB: A Debugger for the Jikes RVM", 10th Conference, ACM, Feb. 13, 2009, pp. 169-172, Germany.

Zeng, K., et al., "Graphical Model Debugger Framework for Embedded Systems", Design, Automation & Test in Europe Conference & Exhibition (DATE), Mar. 2010, pp. 87-92. DOI:10.1109/DATE.2010.5457232. ISBN: 978-1-4244-7054-9. Germany.

Chis, A., et al., "Towards a Moldable Debugger", ACM, Jul. 2013, pp. 1-6, Montpellier, France.

Koju, T., et al., "An Efficient and Generic Reversible Debugger using the Virtual Machine based Approach", Proceedings of the 1st ACM/USENIX international conference on Virtual execution environments (VEE), Jun. 11-12, 2005, pp. 79-88, ISBN:1-59593-047-7. Chicago, Illinois.

Non-Final Office Action dated Nov. 21, 2014, received for U.S. Appl. No. 14/105,634.

Non-Final Office Action dated Dec. 3, 2014, received for U.S. Appl. No. 14/105,674.

* cited by examiner

CODE COVERAGE FRAMEWORK

BACKGROUND

The present invention generally relates to information processing systems, and more particularly relates to software verification mechanisms.

Information processing/handling systems execute software written by programmers. Typically, the programmer writes programs at the source code level. A compiler may then compile the source code to provide object code that the system executes and debug information that describes the object for use by debuggers. Source code and object code may include multiple modules, subroutines, objects, threads, functions and other structures depending on the type of code. Code coverage tools seek to record the results of systematic testing or exercising these subroutines, objects, threads, functions and other structures. Debugger tools seek to assist programmers in locating the mistakes in the source code the programmers produced by allowing the programmers to inspect variables, memory, and registers and manipulate the execution of object code as described by the corresponding debug information.

BRIEF SUMMARY

In one embodiment, a method for recording an execution of a program instruction is disclosed. The method comprises determining that a thread has entered a program unit. A determination is made that the thread is associated with at least one attribute that matches a set of thread recording criteria. An instruction recording mechanism for the thread is dynamically activated in response to the at least one attribute of the thread matching the set of thread recording criteria.

In another embodiment, an information processing system for recording an execution of a program instruction is disclosed. The information processing system comprises a computer memory that is capable of storing machine instructions. A processor is communicatively coupled to the computer memory. The processor is configured to access the computer memory. The processor determines that a thread has entered a program unit. A determination is made that the thread is associated with at least one attribute that matches a set of thread recording criteria. An instruction recording mechanism for the thread is dynamically activated in response to the at least one attribute of the thread matching the set of thread recording criteria.

In yet another embodiment, a computer program product for recording an execution of a program instruction is disclosed. The computer program product comprises a storage medium readable by a processing circuit and storing instructions for execution by the processing circuit for performing a method. The method comprises determining that a thread has entered a program unit. A determination is made that the thread is associated with at least one attribute that matches a set of thread recording criteria. An instruction recording mechanism for the thread is dynamically activated in response to the at least one attribute of the thread matching the set of thread recording criteria.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Figure 1:
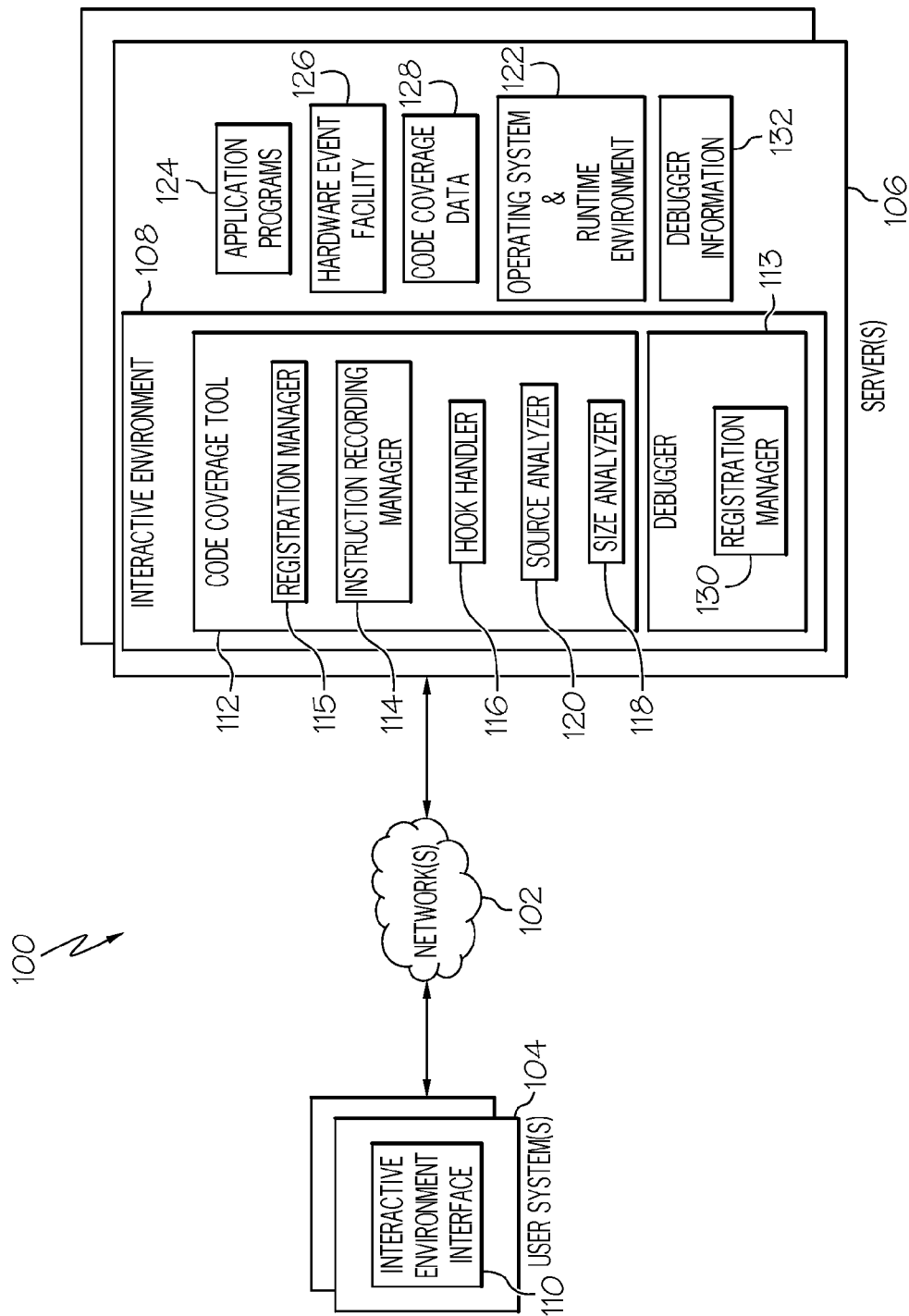
FIG. 1 is a block diagram illustrating one example of an operating environment according to one embodiment of the present invention.

One or more embodiments provide a code coverage tool that minimizes system overhead such that this tool can be utilized in high performance environments on a very large scale (e.g., a design point of 5000 or more registered program units). One or more embodiments utilize operating system hooks to dynamically turn on and off hardware event facility ranges, such as (but not limited to) Program Event Recording (PER) ranges, on a thread basis when a thread (e.g., a segment of computer program code) enters or exits (respectively) a registered program unit. Since the hardware event facility ranges are not statically set for all programs across the system, hardware event facility use is minimized to only occur when it is actually required (e.g., when a thread is executing inside a registered program unit). This allows the operating system to perform dynamic management of programs by loading them into and out of the core as needed without affecting (1) the registered code coverage collection, or (2) the code coverage collection necessitating that programs remain statically loaded to the same location in the core.

Further, various embodiments allow for the user to specify which threads can be collected by code coverage as they are entered based upon registered parameters such as, but not limited to, what kind of communication protocol started the thread in question. This allows a user to collect code coverage data for only the traffic they start without affecting other threads on the system that are entering the same registered programs. Also, the framework provided for the code coverage tool, in one embodiment, operates at the program unit level, as compared to the transaction level, thereby allowing code coverage data to be collected for multiple transactions/driver runs.

It should be noted that the code coverage tool utilizes system hooks and system instruction recording mechanisms. Therefore, the registered code does not need to be recompiled or re-linked in any way. Some embodiments of the present invention do not impose any limitation on the number of modules, objects, or functions registered or the number of threads simultaneously using embodiments of the present invention even in the recording of the instructions for the exact same code. Also, some embodiments of the present invention do not impose any limitation on the number of code coverage collections running simultaneously for different users. If there is a registration overlap of thread criteria, each user may impact the results of the other user's collection. However, if the thread criteria are unique, each user's collection can be completed without impacting the results of other user's collection even for the identical registered code.

In another embodiment, the code coverage tool is integrated with a debugger forming an integrated code coverage-debugger tool. In this embodiment, the debugger displays the results of a code coverage collection that is currently being performed for a program that is currently being debugged. The debugger can then be used to force code paths (by variable manipulation, jump, etc.) such that the code coverage collection results can indicate that a program was fully (or not fully) tested. Integrating the debugger with the code coverage tool provides testing assurance that all lines of code have been tested.

Operating Environment

FIG. 1 shows one example of an operating environment 100 according to one embodiment of the present invention. The operating environment 100 includes one or more networks 102 that, in one embodiment, can include wide area networks, local area networks, wireless networks, and/or the like. The environment 100 includes a plurality of information processing systems 104, 106 that are communicatively coupled to the network(s) 102. The information processing systems 104, 106 include one or more user systems 104 and one or more servers 106. The user systems 104 can include, for example, information processing systems such as desktop computers, laptop computers, wireless devices such as mobile phones, personal digital assistants, and the like.

The server system 106 includes, for example, an interactive environment 108 for performing one or more code coverage collection operations and one or more debugger operations. Users of the user systems 104, 106 interact with the interactive environment 108 via an interface 110 or programmatically via an API. The interactive environment 108, in one embodiment, comprises a code coverage tool 112. In another embodiment, the interactive environment also comprises a debugger 113. In this embodiment, the code coverage tool 112 is integrated with the debugger 113. The code coverage tool 112 comprises an instruction recording manager 114, a registration manager 115, a hook handler 116, a size analyzer 118, and a source analyzer 120. It should be noted that one or more of these components can reside outside of the code coverage tool 112 as well. Each of these components is discussed in greater detail below. The code coverage tool 112 performs code coverage collection operations to monitor code/instruction execution. This allows a user to see which lines of code have been executed and which lines of code have not been executed. The debugger 113 comprises, among other things, a registration manager 130 and utilizes debug information 132 generated by a compiler (not shown) for the program being debugged. Each of these components is discussed in greater detail below. The debugger 113 controls the flow of application program execution for inspecting aspects of programs. The debugger 113 allows users to set breakpoints at specific locations in an application module so that the programmer can step into the code line-by-line, or resume execution of the program as required.

The server system 106 further comprises an operating system and runtime environment 122 and various application programs 124. Program developers create application programs 124 by writing source code, compiling the source code into objects, linking objects into modules, and loading modules to the memory of the computer. Compilers produce debug information 125 that describes the source code, object code, etc. produced by the act of compiling for use by debuggers in assisting the programmer in locating bugs in the source code. In one embodiment, a hardware event facility 126, such as (but not limited to) a Program Event Recorder (PER), is also included within the system 106 that assists in the code coverage and debugging processes. The server system 106 also includes code coverage data 128 that comprises various data either generated by the code coverage tool 112 and/or that is utilized by the various code coverage collection and debugger operations.

Code Coverage Collection

The code coverage tool 112 allows a user to identify which lines of code in an application have been (or have not been) executed. For example, the code coverage tool 112 monitors and communicates the percentage of code executed at the module, object, source file, and/or function level to determine if testing coverage is adequate. Percentages can be specified in terms of the size of the module, object and/or function as well as in terms of the source lines having been executed for the function, source file, and module (accumulation of all lines in all source files). Linkage, data and other miscellaneous constructs are counted as part the code coverage size percentages (e.g., code size divided by the average instruction length, such as 4), but are not counted as part of the code coverage line percentages (source lines with at least one instruction executed divided by the number of executable lines).

In one embodiment, a user initially interacts with the code coverage tool 112, via the user interface 110, to create a code coverage registration entry for a module(s), object(s), or function(s) for code coverage collection. It should be noted that module(s), object(s), or function(s) are also referred to herein as "program unit". A "program unit" generally refers to a unit of application code with defined entry and exit code to which a system hook can be added. Examples of this include object, functions, and modules in the C programming language. That is, all functions in a C program include function linkage code which executes when the function is entered and exited. Similarly, a call to or return to a function in a different program module will execute module linkage code to which a system hook can be added.

During the registration process the user is able to specify Terminal information (which allows the user to limit when data for the list of modules is collected), a program mask (which specifies the list of modules that will have their executed instructions collected), the root directory (optional), and the like. As part of the registration process the user specifies/selects thread selection criteria (also referred to herein as "thread recording criteria"). This set of criteria identifies the threads across all threads and processes in the system that are to be selected for recording. Stated differently, this set of criteria identifies the threads for which an instruction recording mechanism(s) (e.g., a hardware event facility 126) will be activated. For example, the user can specify/select the communication mechanism that starts the thread or any other detail to identify specific threads. It should be noted that the term "thread" as used herein also encompasses processes as well, which are instances of a program.

Figure 2:
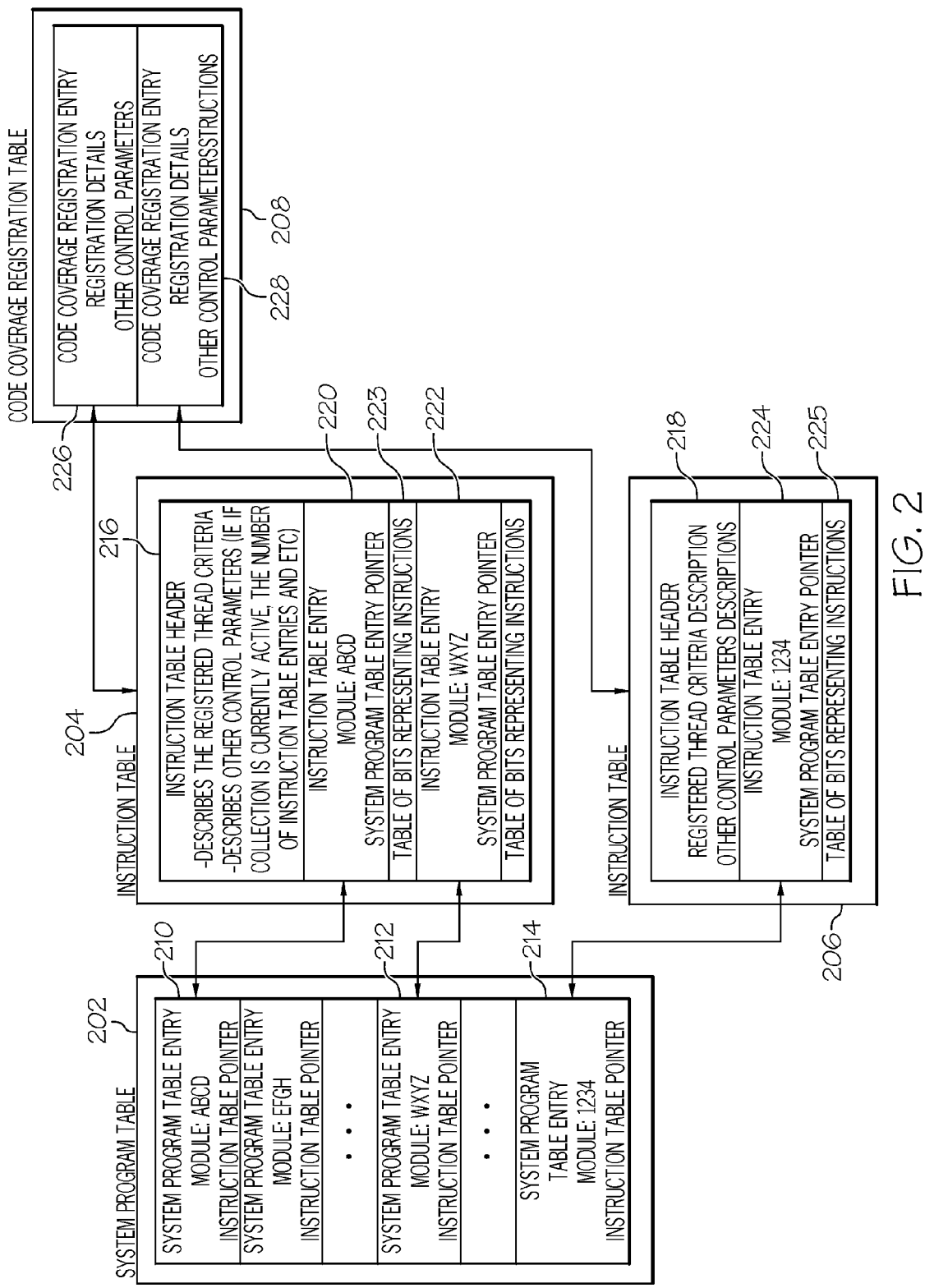
FIG. 2 illustrates various data structures that can be utilized by a code coverage tool for recording instruction execution and/or by a debugger during a debugging operation according to one embodiment of the present invention.

Once the user is finished entering the registration information the user selects a register option to submit the registration information to the code coverage tool 112. This register action reserves the programs for code coverage. The registration manager 115 of the code coverage tool 112 receives the registration information and marks the system structures that manage programs on the system for the registered programs. The registration manager 115 also allocates memory for recording the instructions executed within the program units selected by the user during the registration process. For example, FIG. 2 shows one example of the code coverage collection structures utilized by the code coverage tool 112 for recording instruction execution. In the example shown in FIG. 2, the code coverage tool 112 utilizes a system program table 202, one or more instruction tables 204, 206, and a code coverage registration table 208. These tables and their information are represented as the code coverage data 128 in FIG. 1.

The system program table 202, in one embodiment, is a pre-existing system structure used for loading code from disk, memory, etc. The system program table 202 is modified by the code coverage tool 112 for use by system hooks to manage registered program units in terms of code coverage collection. The system program table 202 comprises system program table entries 210, 212, 214. Each entry includes an identifier associated with a registered program unit. Each entry also includes a pointer to one or more instruction tables 204, 206 for that code coverage registration. For example, FIG. 2 shows a pointer for entries 210, 212, 214, which points to a corresponding instruction table 204, 206. Multiple instruction table pointers are utilized if multiple users have registered the same code.

The instruction tables 204, 206 are used to record an execution of an instruction. In one embodiment, the instruction tables 204, 206 are stored in global memory. Each instruction table 204, 206 comprises an instruction table header 216, 218 and instruction table entries 220, 222, 224. The instruction table headers 216, 218 describe the registered thread criteria and other control parameters (e.g., if code coverage collection is currently active, the number of instruction table entries, and the like). Each instruction table entry 220, 222, 224 comprises information about the registered program unit and a table of flags 223, 225 (e.g., table of bits, table of words, etc.), where each flag represents an instruction in the registered program unit. In one embodiment, a flag can correspond to an even byte address. This is applicable in embodiments that implement an architecture with a minimum instruction length of 2 bytes. However, other implementations and architectures are applicable as well. Each instruction table entry 220, 222, 224 comprises an identifier for a registered program unit and a pointer to a corresponding system program table entry 210, 212, 214.

Each instruction table 204, 206 is associated with a code coverage registration entry 226, 228 in the code coverage registration table 208. The code coverage registration table 208 is utilized by the code coverage tool 112 to record the details of a program unit registration entry and manage the code coverage collection/analysis operations. The code coverage registration entries 226, 228 indicate the registration details for each registered program unit. For example, this registration information can identify a given registered program unit and include a pointer to the instruction table 204, 206 associated therewith. The registration information can identify the thread selection criteria associated with the registered program unit. Registration information can further various other control parameters as well.

Continuing on with the registration process, the registration manager 115 also activates any hooks required to identify specific threads based on the selected criteria identified by the user. For example, communication hooks can be activated to record the communication protocol that started a given thread for each thread in the system as they are created. The registration manager 115 also activates the program unit collection hooks registered by the user. A hook can be activated by, for example, calling a kernel routine with the name of the hooks to activate in the system for the program unit. The registration manager 115, via the user interface 110, informs the user if the registration has been successful or if a failure has occurred. A failure can occur, for example, if code coverage is not permitted for the selected program unit.

Once the registration process has completed, the user can instruct the code coverage tool 112, via the user interface 110, to begin code coverage collection operations for the registered program units. It should be noted that the registration process discussed above can also occur after the user has instructed the code coverage tool 112 to begin code coverage operations. Once a code coverage session has begun traffic is driven on the system that falls in the range of the registered program units. In one embodiment, this step is performed by the user, via the user interface 110, and is specific to how traffic is generated for the application associated with the given program unit. For example, the user may issue a series of commands to start a group of driver test cases.

When any thread is created by the system to accomplish some piece of work, the hook handler 116 of the code coverage tool 112 is called by the hooks (e.g., identification hooks) that identify specific threads based on the specified selection criteria. These identification hooks are called to record the identification criteria in the thread. For example, one type of selection criteria is the communication mechanism that starts the thread, as discussed above. Therefore, in this example, the hook handler 116 of the code coverage tool 112 is called by the communication hooks to record the TCP/IP address in the thread control block. The thread then returns from the identification hooks and resumes normal execution.

As a thread enters any module, object, or function, the code coverage tool 112 determines if the module, object, or function is registered for code coverage. The code coverage tool 112, via the instruction recording manager 114 activates an instruction recording mechanism if the criteria are satisfied. In one embodiment, the code coverage tool 112 performs these operations by using system hooks. For example, as a thread enters any program unit a hook handler 116 is called by systems hooks. The hook handler 116, in one embodiment, can be called by system hooks embedded in linkage code for executing calls and returns between the application programming units.

The hook handler 116 analyzes the entries 210, 212, and 214 of the System Program Table (or, in another embodiment, the entries of the code coverage registration table 208) to determine if the program unit being entered into by the thread is registered for code coverage. If the program unit is not registered for code coverage (e.g., the system program table entry has not been marked) execution of the thread continues as normal without any further intervention. If the module, object, or function is registered for code coverage the hook handler 116 analyzes the instruction table header 216, 218 to identify the thread selection criteria for the registered program unit. The hook handler 116 then compares this selection criteria to the identification criteria in the thread, which was previously recorded as discussed above. For example, continuing with the communications protocol example, the hook handler 116 compares the recorded TCP/IP address (thread identification criteria) in the thread control block to the registered TCP/IP address (thread selection criteria) to determine if they match. If the thread fails to satisfy the registered selection criteria, execution of the thread continues as normal without any further intervention. If however the thread does satisfy the registered selection criteria the instruction recording manager 114 activates the instruction recording mechanism, via the hook handler 116, for this thread for the current program unit being entered into by the thread. Execution of instructions in this program unit is then recorded. In one embodiment, the instruction recording mechanism is a hardware assisted instruction recording mechanism such as the hardware event facility 126.

As a thread exits any program unit the code coverage tool 112 determines if the thread is currently running with the instruction recording mechanism active. If so, the instruction recording manager 114 of the code coverage tool 112 deactivates the instruction recording mechanism for the thread. The code coverage tool 112 can perform these operations using one or more system hooks via a hook handler 116. For example, a hook handler 116 can analyze the thread control block to determine if the instruction recording mechanism is active for this particular thread. If so, the hook handler 116 can deactivate the instruction recording mechanism. In one embodiment, the hook handler 116 can be implemented in the system hooks.

As can be seen from the above, the code coverage tool 112 dynamically activates (or deactivates) the instruction recording mechanism using one or more system hooks via the hook handler 116 on a thread basis as a thread enters (or exits) a registered program unit. The code coverage tool 112, via the system hooks, is able to determine on a thread basis if the conditions for setting an instruction recording bracket have been met. With this bracket in place when any instruction inside that program is fetched by the hardware, an instruction recording interrupt (e.g., hardware event facility interrupt) occurs and the execution of this instruction is recorded. Since the address ranges for the instruction recording mechanism are not statically set for all programs across the system, the use of the instruction recording mechanism is minimized to only occur when it is actually required, such as when a thread is executing inside a registered program unit. This allows the operating system to perform dynamic management of programs by loading them into and out of the core as needed without affecting (1) the registered code coverage collection, or (2) the code coverage collection necessitating that programs remain statically loaded to the same location in the core. In this embodiment of the code coverage tool the registered code does not need to be recompiled or re-linked in any way.

Figure 3:
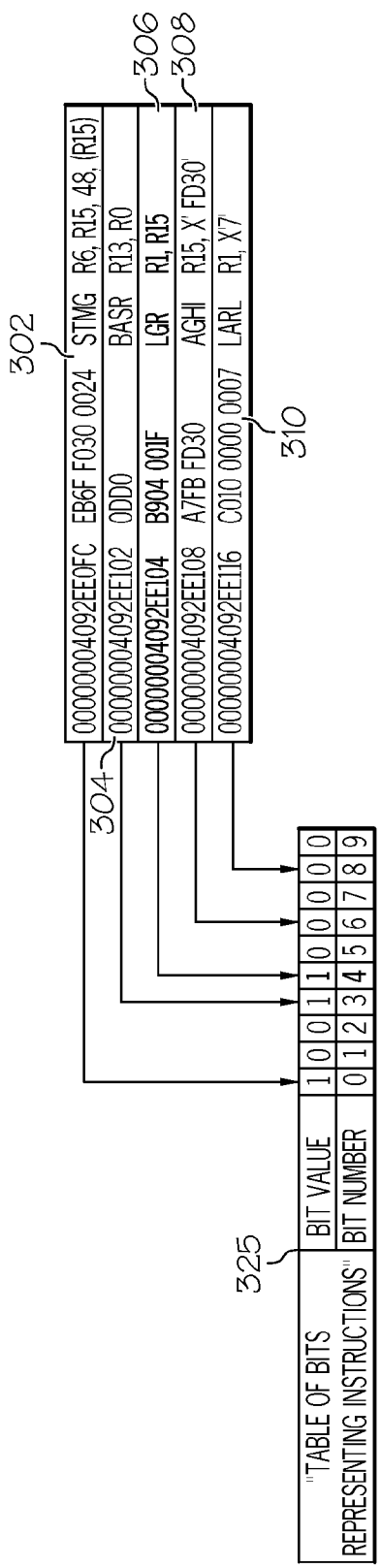
FIG. 3 shows one example of recording instruction execution according to one embodiment of the present invention.

In one embodiment, the instruction recording mechanism is a hardware event facility 126 such as, but not limited to, PER. A more detailed discussion on PER can be found in *z/Architecture® Principles of Operation*, IBM® Pub. No. SA22-7832-02, 3rd Edition, (June 2003), which is hereby incorporated by reference in its entirety. As the thread executes within the registered program unit, the instruction recording mechanism records every instruction that is executed for the registered program unit (module, objection, or function). In one embodiment, these instructions are record within the instruction tables 204, 206 discussed above. FIG. 3 shows one example of how an executed instruction is recorded. In particular, FIG. 3 shows one example of a table of bits 325 representing instructions. As discussed above with respect to FIG. 2, this table of bits 325 is included within the instruction tables 204, 206 for each instruction table entry 220, 222, 224. FIG. 3 also shows one example of instructions 302, 304, 306, 308, 310 for a registered program unit associated with to the table of bits 325.

The table of bits 325 comprises a bit number and a corresponding bit value for a given bit. Each bit represents a 2-byte address in memory. However, other implementations are applicable as well depending on the architecture of the system. For example, the first bit in the table, bit 0, represents address 4092EE0FC. The second bit, bit 1, represents address 4092EE0FE. The third bit, bit 2, represents address 4092EE100. The fourth bit, bit 3, represents address 4092EE102, and so on. If an instruction is executed the instruction recording manager 114 through the instruction recording mechanism records this execution by setting the bit value to 1, where a value of 1 indicates that the instruction has executed and a value of 0 indicates that the instruction has not executed. The bit table entry (or the system program table 202) records the start address of the registered code. As such, the table of bits 325 representing instructions can be indexed into very quickly based on the address of the instruction fetched. The following (fetched instruction address−start address of the registered code)/2 gives the index to the bit to be manipulated at fetch time, for example, (4092EE104−409EE0fC)/2=bit 4.

The following is an illustrative example of the events that trigger the instruction execution recording process. When one or more attributes of the thread match the thread selection criteria then a hardware event facility address range for the program unit being entered into is set. When an instruction is fetched its associated address is compared to the hardware event facility address range. If the instruction exists within the hardware event facility address range then a hardware event facility interrupt is generated. An interrupt handler examines the interrupt details to determine who (debugger, code coverage tool, etc.) needs to process the interrupt. This is accomplished by examining a set of tables in the thread process block. If the interrupt is for a code coverage tool hardware event facility address range, the bit representing the address for this instruction in the instruction table for the current program unit is set to 1 if the bit is currently set to 0. The instruction table 204 for the current program unit was stored in the process block by the hook handler 116. Also in the hook handler 116, the hardware assisted instruction recording mechanism is turned on/off, the type of hardware assisted instruction recording mechanism is set (instruction fetch and branch) and the address range is set (the hardware assisted instruction recording mechanism type and address range is saved in control registers).

Figure 4:
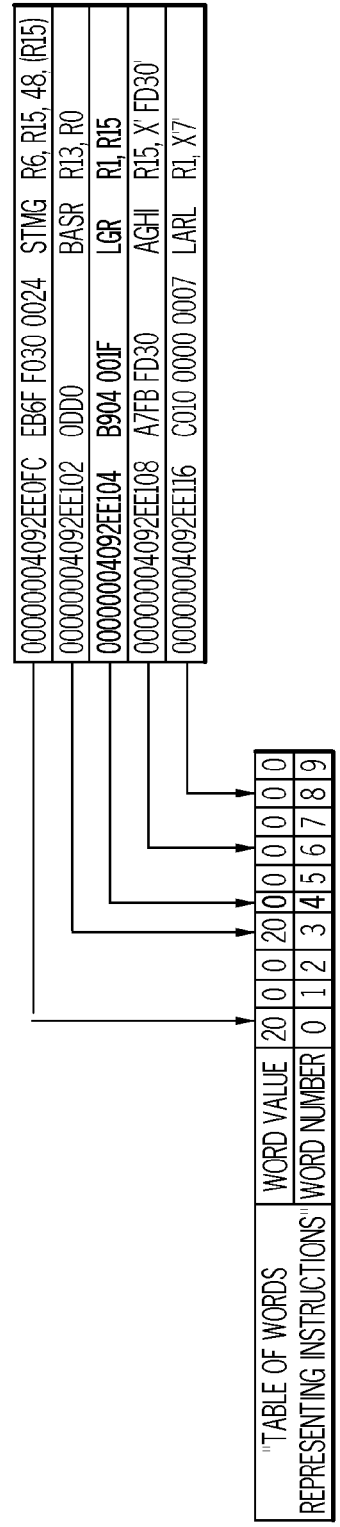
FIG. 4 shows another example of recording instruction execution according to one embodiment of the present invention.

It should be noted that embodiments of the present invention are not limited to recording bits. For example, instruction counting or any other recording mechanism can be implemented as well. FIG. 4 shows one such example where a word table 425 with locking is utilized for recording the number of times an instruction is executed across all threads. Similar to FIG. 3, each word in the table of words 425 representing instructions represents a 2-byte address in memory in this example. Each word represents the number of times an instruction has been executed. For example the first word in the table represents address 4092EE0FC. The second word in the table represents address 4092EE0FE. The third word in the table represents address 4092EE100. The fourth word in the table represents address 4092EE102, and so on. If an instruction is executed, the table of words 425 is locked. The value of the word corresponding to the instruction is incremented by 1, which indicates that this instruction has been executed a given number of times. The table of words 425 is then unlocked. The word table entry (or the system program table) records the start address of the registered code. As such, the table of words 425 can be indexed into very quickly based on the address of the instruction fetched. The following (fetched instruction address−start address of the registered code)/2 gives the index to the word to be manipulated at fetch time, for example, (4092EE104-4092EE0FC)/2=word 4.

As the code coverage collection operation discussed above is being performed, the user is able to view the status/progress of the code collection operations such as the current number of instructions that have been executed for the registered program unit. At any point in time, the user can save the current results of the code coverage collection and view these results or perform various types of analysis while the code coverage collection continues to operate. Alternatively, the results can be saved once the code coverage collection operations have completed or have been manually stopped by the user. These results can be saved in one or more files that are annotatable by the user. In one embodiment, the contents of the code coverage registration table 208 and the instruction tables 204, 206 are stored into a file. The user, via the user interface 110, can then view the saved results, which can be sorted, exported, and manipulated in a variety of ways.

The code coverage tool 112 can display a first view to the user via the user interface 110 that illustrates which program units have been executed and which have not. This high level analysis can be performed using the contents of the code coverage registration table 208 and the instruction tables 204, 206 that have been stored into a file. This is useful, for example, for very large code coverage runs. For example, if the user registered thousands of modules the user can see which modules are not executed by the driver suite. In another example, the user is able to instruct the code coverage tool 112 to perform one or more levels of analysis on the code coverage collection results.

A first type of analysis is size analysis, which is performed by the size analyzer 118 of the code coverage tool 112. A size analysis allows the user to see executed instruction percentages at the module, object, and function, and source file levels. For example, the user can select one or more registered modules displayed by the code coverage tool 112 for size analysis. Once the size analysis has completed, the code coverage displays every module, object, and function that was registered for code coverage collection. For example, the user is able to select a module that was analyzed using the size analysis process. This allows the user to see details at the function and object level such as which function and objects have been executed and which have not been executed. This is useful to know, for example, if a driver, driver suite, etc. exercises every function. The code coverage tool, via the user interface 110, displays a percentage of the module, object, and/or function that has been executed.

Figure 5:
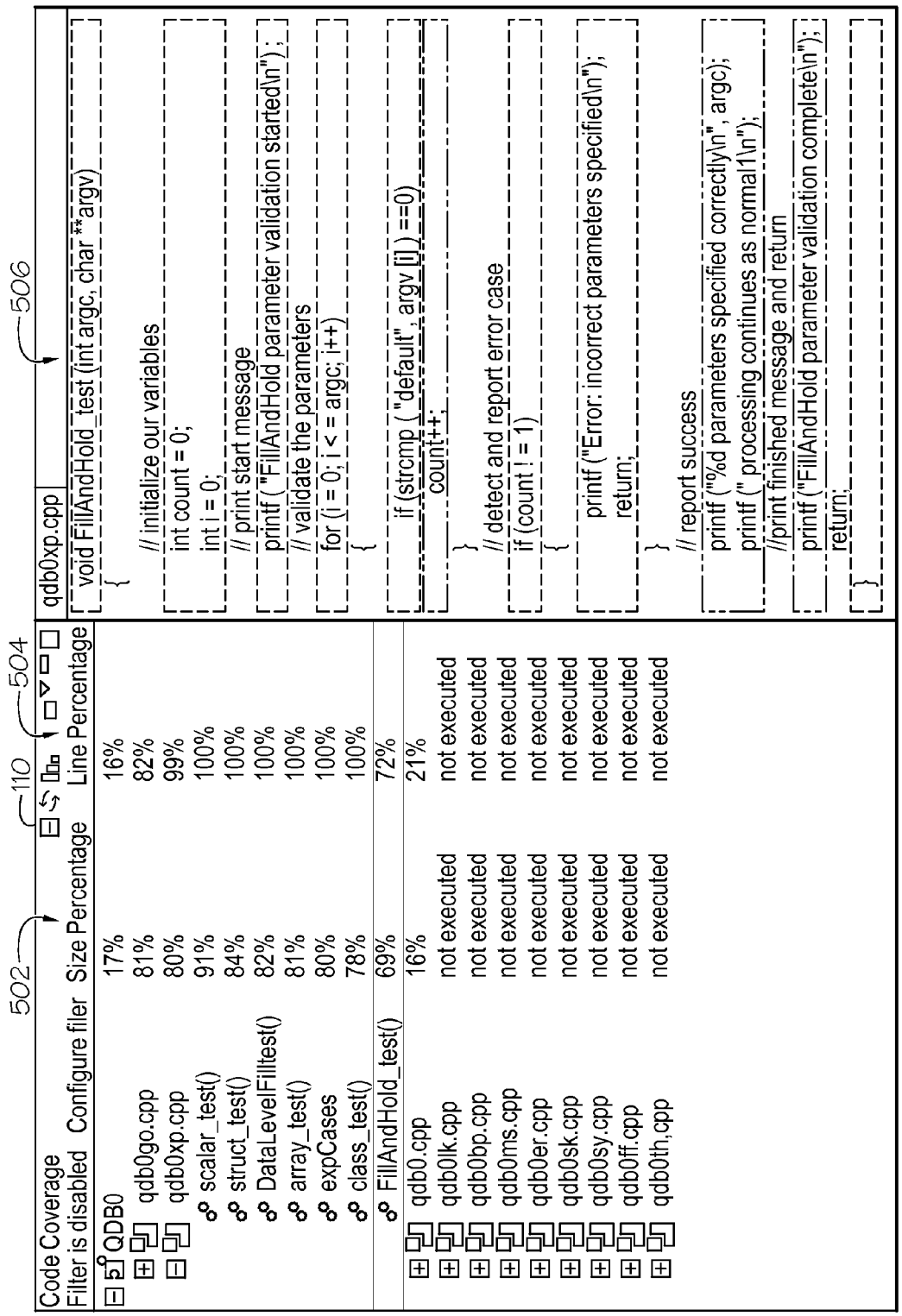
FIG. 5 illustrates one example of a user interface for displaying code coverage collection results to a user according to one embodiment of the present invention.

In addition to size analysis, the user can select a source analysis option to see the percentages of execution at the source file level. In this embodiment, if the user selects a source file of function and source analysis has been completed, the source file is opened and the executed lines are called out to the user (e.g., visually altered). FIG. 5 shows one example of how the code coverage tool 112 can display source analysis results to the user. In this example, the user interface 110 displays, in one or more windows, a plurality of modules that the user has registered for code coverage collection. The user interface 110 shows size percentage information 502 resulting from a size analysis and line percentage information 504 resulting from a source analysis for each module. For example, FIG. 5 shows that the size percentage of module QDB0 is 17% and the line percentage is 16%.

A user is able to expand a displayed module to view the source files (or objects) associated therewith. For example, FIG. 5 shows that the user has expanded the QDB0 module and a plurality of source files have been displayed. Size percentage and line percentage information 502, 504 is for each source file is also displayed to the user. The user interface 110 also allows the user to expand the source file names to view associated functions. For example, FIG. 5 shows that the user has expanded the source file qdb0xp.cpp to view the functions associated with this source file. These functions are also displayed with size percentage and line percentage information 502, 504.

As can be seen, the line percentage on FillAndHold_Test( ) does not have 100% of its instructions executed. Therefore, the user is able to select the FillAndHold_Test( ) icon to open the source file to the location of this function, which is displayed to the user either in a new window or in a portion of the same window as shown in FIG. 5. The code coverage tool 112 highlights (or visually alters) any line that was not executed. For example, FIG. 5 represents this visual alteration by highlighting executed lines with a dashed box and non-executed lines with a dash-dot-dot box. This allows the user to easily identify unexecuted lines. It should be noted that other notification mechanisms such as auditory mechanisms can be used to notify a user of source code lines/instructions that have been executed.

Debugger

Debugger tools such as the debugger 113 seek to assist programmers in locating the mistakes in the source code the programmers produced by allowing the programmers to inspect variables, memory, and registers and manipulate the execution of object code as described by the corresponding debug information. Through the user interface 110 the user identifies, such as by performing a register action, which program units should be debugged. In one embodiment, the debugger registration manager 130 marks the system program table entry 204 as requested for debugging. When a thread enters a program unit requested for debugging as identified in the system program table entry 204, the system 106 starts an instance of the debugger 113 with the thread stopped at the entry point of the program unit. The debugger 113 then utilizes the debug information 132 to allow the programmers to inspect variables, memory, and registers of the program unit being debugged. Also, the debug information 132 describes to the debugger 113 how the executable object code lines up to the source code such that the user can control the execution of the program unit. A more detailed discussion on debugger information can be found in "DWARF Debugging Information Format", UNIX International, Programming Languages SIG, Revision 2.0.0 (Jul. 27, 1993), which is hereby incorporated by reference in its entirety.

In one embodiment, the control of the execution of the program unit is accomplished by using a hardware assisted mechanism such as the hardware event facility 126. The hardware assisted mechanism, in one embodiment, is a hardware event facility 126 such as, but not limited to, PER. The hardware assisted mechanism is controlled by the debugger to implement execute actions such as setting breakpoints, running the thread, stepping the thread, etc. to control the execution of the thread for the registered program unit (module, objection, or function). In another embodiment, overlays can be used to control the execution of the thread for the registered program unit (module, objection, or function).

In one embodiment, the code coverage tool 112 is integrated with the debugger 113 forming an integrated code coverage-debugger tool. In this embodiment, the debugger 113 displays the results of a code coverage collection that is currently being performed for a program that is currently being debugged. The debugger 113 can then be used to force code paths (by variable manipulation, jump, etc.) such that the code coverage collection results can indicate that a program was fully (or not fully) tested. Integrating the debugger 113 with the code coverage tool 112 provides testing assurance that all lines of code have been tested. One advantage of integrating the debugger 113 with the code coverage tool 112 is that a user not required to rely on transactions or a wide variety of driver runs to execute all possible paths through the code. Another advantage is that a user is able to test lines of code written for hardware failures or the like that cannot be simulated or forced by a driver. It should be noted that embodiments of the present invention are not limited to the code coverage tool or debugger discussed herein. Embodiments of the present invention are applicable to the integration of any debugger and any code coverage tool.

As discussed above, the code coverage tool 112 can maintain the results of the code coverage collection in memory while collection is running. The debugger 113, in one embodiment, integrates these results of the code coverage collection into the source/disassembled views of the application source code. For example, the debugger 113 visually alters (e.g., highlights, marks, etc.) the source code lines to show the user which lines/instructions have been executed. As the user steps, runs, or otherwise drives the execution of the application code in the debugger 113, the code coverage tool 112 collects the execution of the instructions in the application and the debugger 113 in turn updates the source/disassembled view with the additional lines/instructions that have been executed. Since the debugger controls the execution of the thread, the use of the debugger influences which instructions are executed and therefore the code coverage collection results. The user can utilize the debugger to perform execution actions to ensure that each line/instruction is tested.

Figure 6:
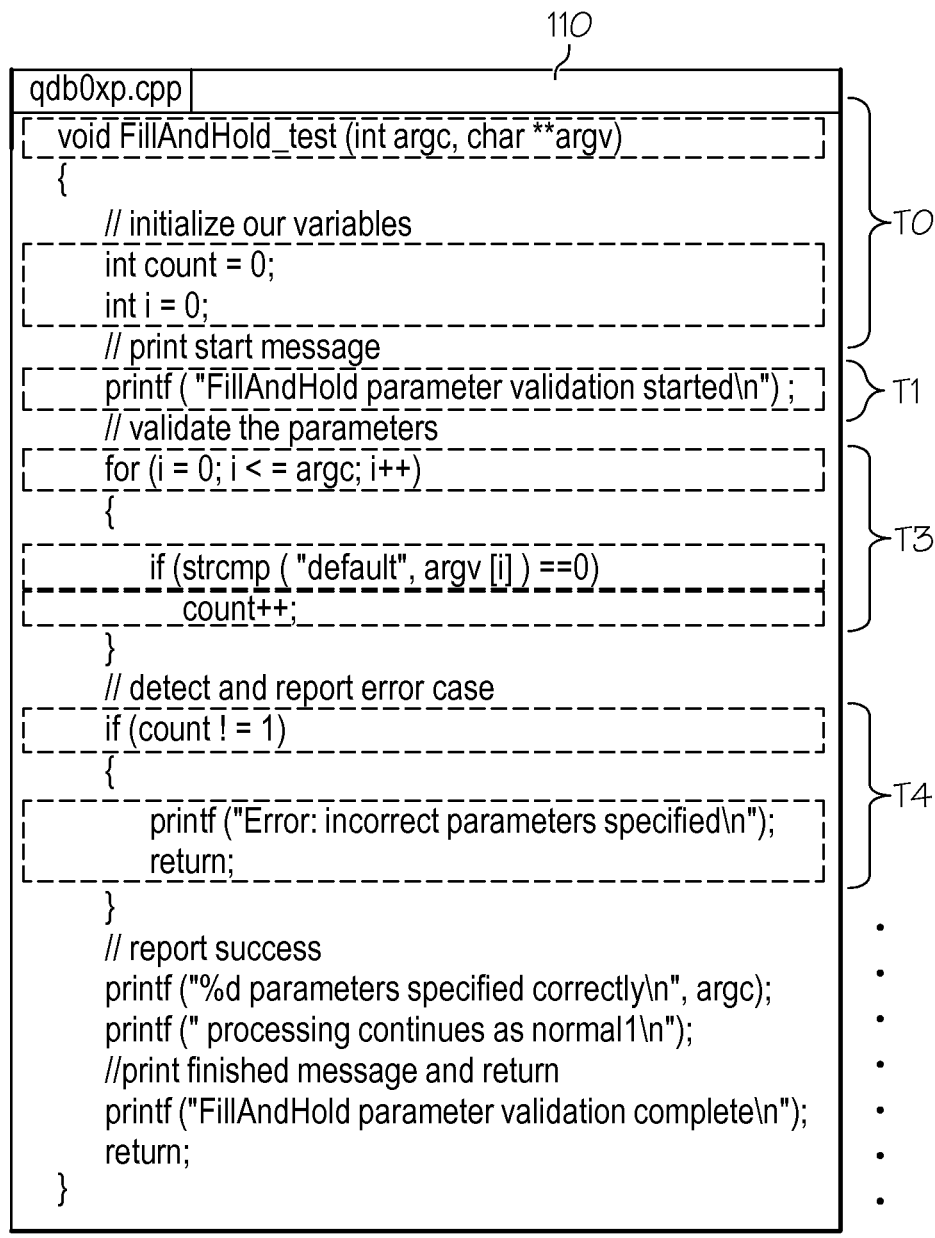
FIG. 6 illustrates one example of a user interface for displaying code coverage collection results to a user as part of a debugging process according to one embodiment of the present invention.

For example, FIG. 6 shows another example of the user interface 110 where a user is interacting with the debugger 113 and is being shown a source/disassembled view of application source code. In this example, the user is debugging the source file qdb0xp.cpp and is also performing code coverage collection on the registered module associated with this source file. As the source code is debugged, the debugger 113 references the system program table 202 for the debugged code. The debugger 113 determines if the system program table 202 includes a code coverage data pointer, such as an instruction table pointer, associated with the debugged code. If the system program table 202 does not include this pointer then the debugging process continues as normal. However, if the system program table 202 does include this pointer then the debugger 113 uses the debug information 132 to interpret the content of the instruction table 204, 206. For instance, the following is one example of debug information 132: /ztpf/blddrvklebug/qdb0xp.cpp: [334,–1] 0x5dd4//new statement. "334" is the line number that corresponds to the assembler instructions located at offset 0x5dd4 in the qdb0xp object code. The debugger 113 uses this table to identify which range of instructions in the object code, in terms of offsets, is associated with which lines of source code in the source file.

For example, the debugger 113 determines which lines of the source code have been executed based on the information in the code coverage data (e.g., instruction table) entry(s) 204, 206 as indicated by the line table in the debug information. The debugger 113 then visually alters the source code displayed in the source/disassembled view of the user interface 110 to identify the executed (and/or non-executed) lines or instructions. For example, FIG. 6 shows that at the time the code coverage collection results were recorded, time T0, the first 3 lines of code in the view have been executed, as indicated by the dashed boxes surrounding these lines of code. It should be noted that other threads can be executing the same code, thereby influencing the results that should be displayed. Therefore, the user can refresh the results displayed in the source/disassembled view to take into account instruction executions resulting from the other threads. Alternatively, the code coverage tool 112 can notify the debugger 113 when additional lines/instructions have been executed and the debugger 113 can automatically update the source/disassembled view.

As part of the debugging process, the user is able to select an action through the debugger 113 that executes an instruction(s). After this execution has completed the debugger 113 updates the view of the source code to indicate the lines have been executed and the current point of execution. For example, the user at time T1 performs an execution action during the debugging process. At this point the executed lines/instruction up until and including time T1 are visually identified to the user. At time T2 the user performs another execution action resulting in subsequent lines/instructions being executed. The executed lines/instruction up until and including time T2 are visually identified to the user. This process continues for each subsequent execution action performed by the user.

Also, the debugger 113 can determine that the code coverage tool 112 has detected that another set of instructions has been executed by at least one thread that is external to a thread associated with the current debugging process. The debugger can then update the user interface 110 to display a set of source code corresponding to another set of instructions. In this embodiment, the set of source code can visually altered to indicate that the another set of instructions has been executed In addition to the above, a summary view could be implemented to provide details about the results of the currently running code coverage collection such as the program, object, and function executed instruction percentage. For example, upon stepping through a final error path in the code, the execution percentage of the function displayed in a summary view could be automatically changed to 100% such that the user knows there are no further paths to drive in this function.

In this embodiment, the above integration of the code coverage tool 112 and debugger 113 can be accomplished because the code coverage tool instruction recording events (e.g., PER events) are processed before the debugger instruction recording events (e.g., PER events) events such that the most current code coverage results are always available when the debugger stops the application. Additionally, other drivers on the system can update the code coverage results on the system for the program that is being debugged and the source/disassembled views can be automatically updated with the updated results.

Operational Flow Diagrams

Figure 7:
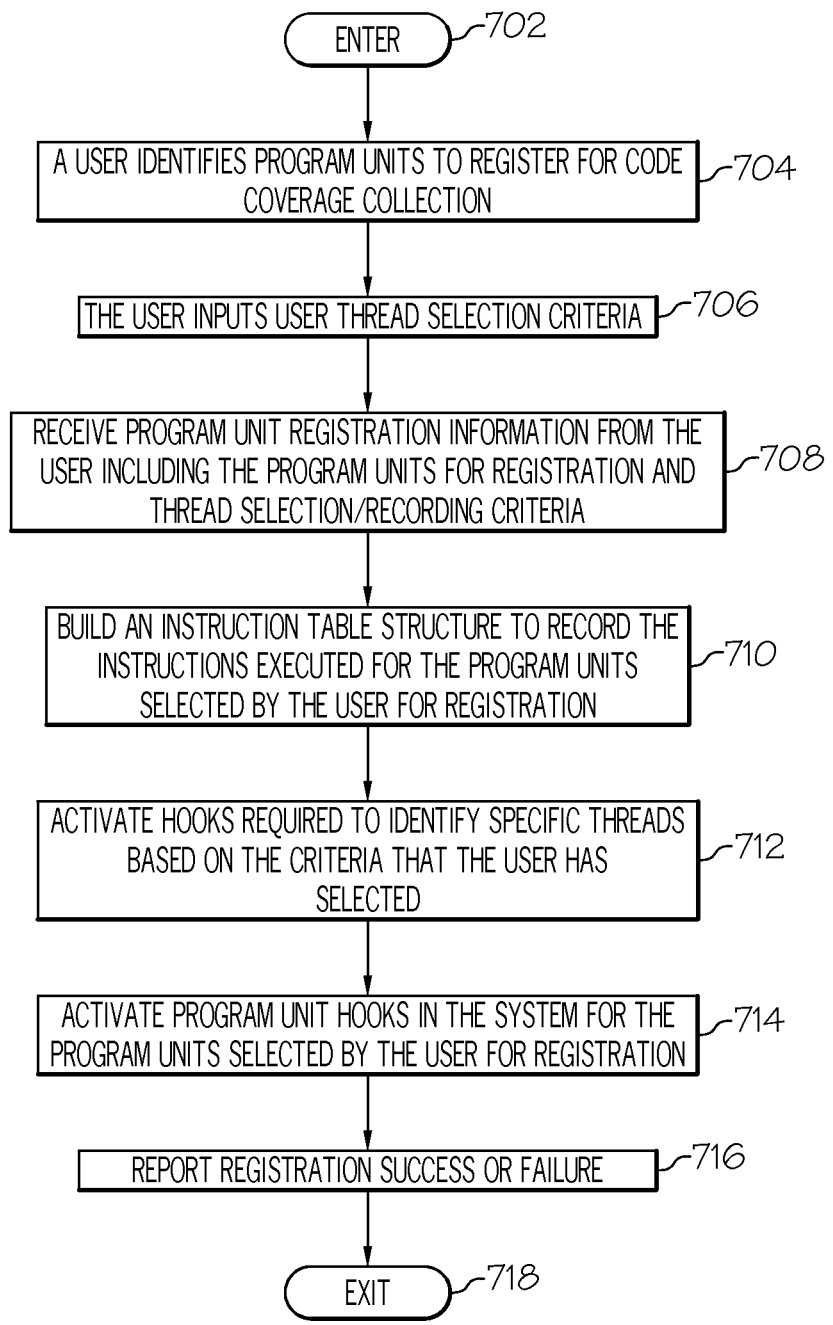
FIG. 7 is an operational flow diagram illustrating one example of a code coverage registration process according to one embodiment of the present invention.

FIG. 7 shows an operational flow diagram illustrating one example of a program unit registration process for code coverage collection. It should be noted that the steps of the operation flow diagram shown in FIG. 7 have already been discussed above in greater detail. The operational flow diagram of FIG. 7 begins at step 702 and flows directly to step 704. A user, at step 704, interacts with the code coverage tool 112 via the user interface 110 and identifies one or more program units to register for code coverage collection. The user, at step 706, inputs user thread selection criteria. This thread selection criteria identifies one or more thread attributes (e.g., a given communication address) that can be used to identify threads for activating an instruction execution mechanism. The code coverage tool 112, at step 708, receives the program unit registration information including the identified program units and thread selection criteria from the user.

The code coverage tool 112, at step 710, builds an instruction table structure 204 to record the instructions executed for the program units registered by the user. The code coverage tool 112, at step 712, activates hooks required to identify specific threads based on the selection criteria that has been selected by the user. The code coverage tool 112, at step 714, activates program unit hooks in the system for the registered program units. The code coverage tool 112, at step 716, reports a registration success of failure to the user via the user interface 110. The control flow then exits at step 718.

Figure 8:
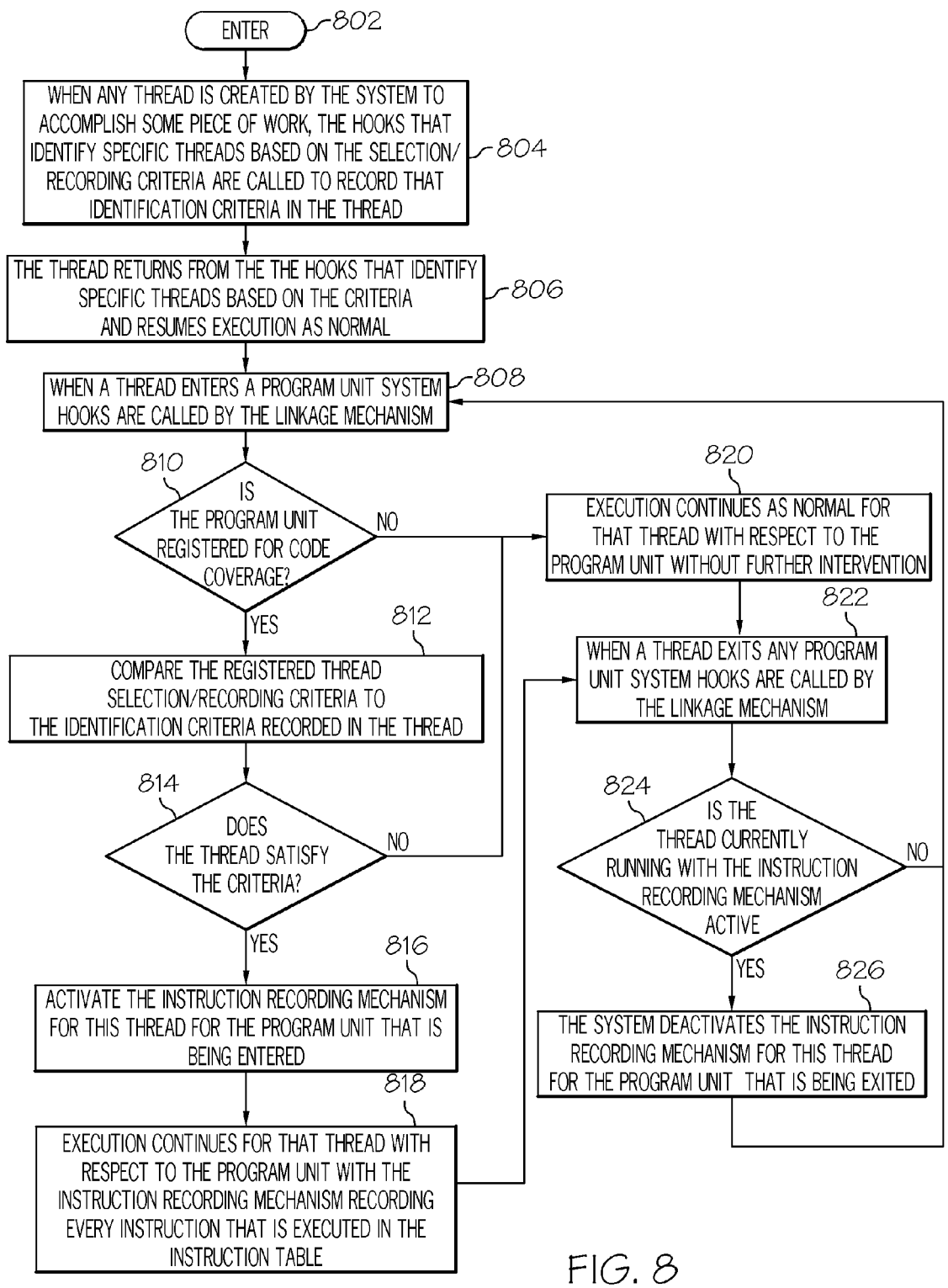
FIG. 8 is an operational flow diagram illustrating one example of a process for dynamically activating an instruction execution recording process according to one embodiment of the present invention.

FIG. 8 shows an operational flow diagram illustrating one example of managing instruction recording for code coverage collection. It should be noted that the steps of the operation flow diagram shown in FIG. 8 have already been discussed above in greater detail. Also, one or more embodiments operated in a multithreaded multiprocessing environment. As such, the steps below can be executed simultaneously by any number of threads on the system, possibly even for the same registered code. The operational flow diagram of FIG. 8 begins at step 802 and flows directly to step 804. The operating system 122, at step 804, calls identification hooks whenever any thread is created by the system to accomplish some piece of work. These identification hooks identify specific threads based on the selection criteria selected by the user and records these identification attributes for the thread.

The thread, at step 806, returns from the identification hooks and resumes execution as normal. As the thread enters a program unit, the operating system 122, at step 808, calls system hooks. Using these system hooks the code coverage tool 112, at step 810, determines if the program unit is registered for code coverage collection. If the result of this determination is negative, the control flows to step 820 where execution of the thread continues as normal without further intervention. The control then flows to step 822. If the result of this determination is positive, the code coverage tool 112, at step 812, compares the registered thread selection criteria to the identification criteria recorded for the thread. The code coverage tool 112, at step 814, determines if the thread satisfies the selection criteria based on this comparison. If the result of this determination is negative, the control flows to step 820 where execution of the thread continues as normal without further intervention. The control then flows to step 822. If the result of this determination is positive the code coverage tool 112, step 816, activates an instruction recording mechanism for this thread for the program unit that is being entered into. It should be noted that the code coverage tool 112 can utilize one or more system hooks to perform steps 810 to 816.

Execution of the thread, at step 818, continues as normal without further intervention where the instruction recording mechanism records every instruction that is executed in the instruction table 204 with respect to the program unit. When a thread exits any program unit the operating system 122, at step 822, once again calls system hooks. The code coverage tool 112, at step 824, uses these system hooks to determination if the thread is currently running with the instruction recording mechanism active. If the result of this determination is negative, the control flow returns to step 808. If the result of this determination is positive, the code coverage tool 112, at step 826, deactivates the instruction recording mechanism for this thread with respect to the program unit being exited. The code coverage tool 112 is able to display code coverage collection results to the user at any point during the above process. The control flow then returns to step 808.

Figure 9:
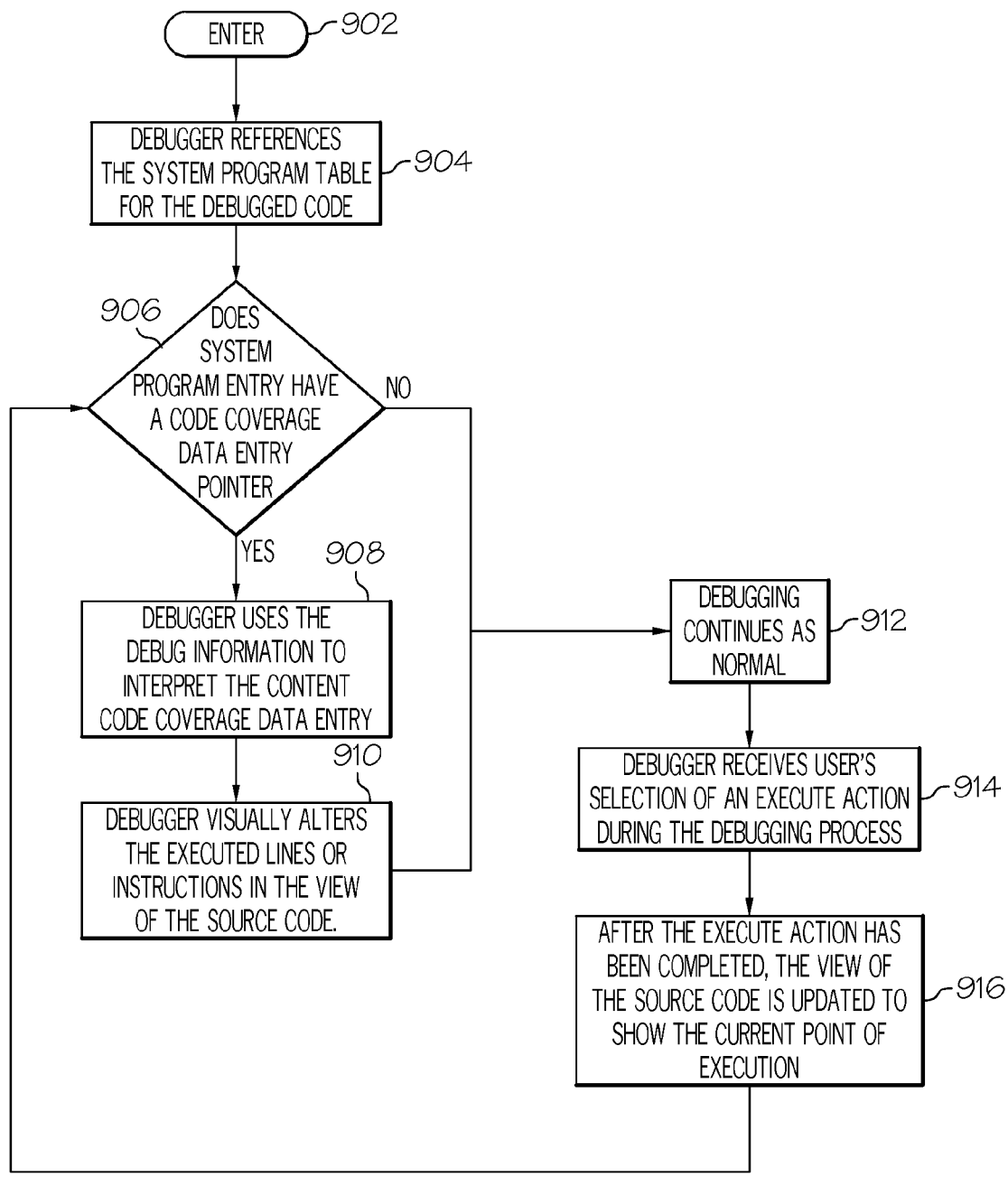
FIG. 9 is an operational flow diagram illustrating one example of process for displaying code coverage collection results to a user as during a debugging process according to one embodiment of the present invention.

FIG. 9 shows an operational flow diagram illustrating one example of providing code coverage collection results to a user through a debugger. It should be noted that the steps of the operation flow diagram shown in FIG. 9 have already been discussed above in greater detail. The operational flow diagram of FIG. 9 begins at step 902 and flows directly to step 904. During a debugging process the debugger 113, at step 904, references the system program table 202 for the debugged code. The debugger 113, at step 906, determines if the corresponding system program table entry 210 comprise a pointer to a code coverage data entry such as an entry in the instruction table 204. If the result of this determination is negative, the control flows to step 912, where debugging continues as normal. If the result of this determination is positive, the debugger 113, at step 908, uses the debug information to interpret the content of the code coverage data entry. Based on the information in the instruction table 204 the debugger 113, at step 910, visually alters the executed lines/instructions within the portion of the user interface 110 displaying the source code being debugged. The debugging process, at step 912, continues as normal. The debugger 113, at step 914, receives a user's selection for an execution action, which is then performed by the debugger. After this execution has completed, the debugger 113, at step 916, updates the current view of the source code to show the current point of execution and any lines/instruction that have been executed in response to the execution action. The control flow then returns to step 906.

Information Processing System

Figure 10:
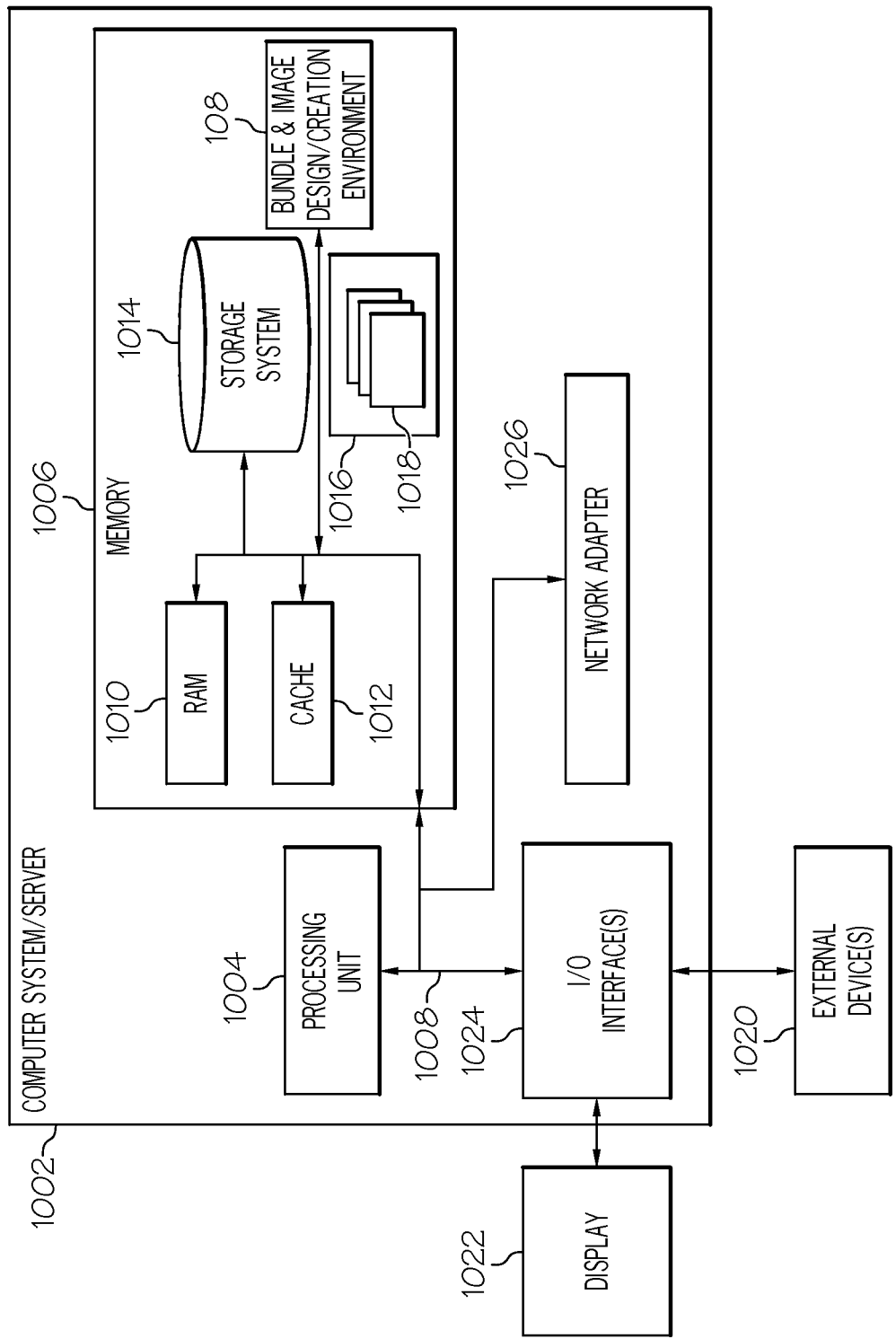
FIG. 10 illustrates one example of a cloud computing node according to one embodiment of the present invention.

Referring now to FIG. 10, a schematic of an example of an information processing system, such as the server 106 of FIG. 1, is shown. Information processing system 1002 is only one example of a suitable system and is not intended to suggest any limitation as to the scope of use or functionality of embodiments of the invention described herein. Regardless, the information processing system 1002 is capable of being implemented and/or performing any of the functionality set forth hereinabove.

The information processing system 1002 can be a personal computer system, a server computer system, a thin client, a thick client, a hand-held or laptop device, a multiprocessor system, a microprocessor-based system, a set top box, a programmable consumer electronic, a network PC, a minicomputer system, a mainframe computer system, a distributed cloud computing system, or the like.

As illustrated in FIG. 10, the information processing system 1002 is shown in the form of a general-purpose computing device. The components of the information processing system 1002 can include, but are not limited to, one or more processors or processing units 1004, a system memory 1006, and a bus 1008 that couples various system components including the system memory 1006 to the processor 1004.

The bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The information processing system 1002 typically includes a variety of computer system readable media. Such media may be any available media that is accessible by the information processing system 1002, and it includes both volatile and non-volatile media, removable and non-removable media.

The system memory 1006, in one embodiment, comprises the interactive environment 108, its components, and the remaining elements of the server 106 as shown in FIG. 1. These one or more components can also be implemented in hardware as well. The system memory 1006 can include computer system readable media in the form of volatile memory, such as random access memory (RAM) 1010 and/or cache memory 1012. The information processing system 1002 can further include other removable/non-removable, volatile/non-volatile computer system storage media. By way of example only, a storage system 1014 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1008 by one or more data media interfaces. As will be further depicted and described below, the memory 1006 may include at least one program product having a set (e.g., at least one) of program modules that are configured to carry out the functions of various embodiments of the invention.

Program/utility 1016, having a set (at least one) of program modules 1018, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. Program modules 1018 generally carry out the functions and/or methodologies of various embodiments of the invention as described herein.

The information processing system 1002 can also communicate with one or more external devices 1020 such as a keyboard, a pointing device, a display 1022, etc.; one or more devices that enable a user to interact with the information processing system 1002; and/or any devices (e.g., network card, modem, etc.) that enable computer system/server 1002 to communicate with one or more other computing devices. Such communication can occur via I/O interfaces 1024. Still yet, the information processing system 1002 can communicate with one or more networks such as a local area network (LAN), a general wide area network (WAN), and/or a public network (e.g., the Internet) via network adapter 1026. As depicted, the network adapter 1026 communicates with the other components of information processing system 1002 via the bus 1008. It should be understood that although not shown, other hardware and/or software components could be used in conjunction with the information processing system 1002. Examples, include, but are not limited to: microcode, device drivers, redundant processing units, external disk drive arrays, RAID systems, tape drives, and data archival storage systems, etc.

Non-Limiting Examples

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for recording an execution of a program instruction, the method comprising:
    receiving user interaction with a user interface of a code coverage tool, the user interaction specifying at least a set of thread recording criteria for a program unit of computer application program code;
    storing, based on the received user interaction, a code coverage registration entry in a code coverage registration table, the code coverage registration entry comprising registration details of a set of instructions in the program unit of computer application program code, the registration details comprising indication of instruction execution recording criteria for the set of instructions in the program unit and indication of a set of thread recording criteria for the program unit, at least the set of thread recording criteria for the program unit being specified by the user interaction;
    storing, based on the stored code coverage registration entry, a table comprising flags representing the set of instructions in the program unit, each flag corresponding to an instruction in the program unit, a value of each flag in the table indicating whether a corresponding instruction in the set of instructions in the program unit has been executed;
    updating, based on the stored code coverage registration entry, operating system data structures that manage computer programs on the operating system to reserve the program unit for code coverage collection, the updating comprising:
        updating at least one entry in a system program table to identify the program unit as being registered for code coverage collection, the at least one entry in the system program table includes the start address of the code of the registered program unit;
        activating first at least one system hook that identifies when a specific thread has been entered, based on the specified set of thread recording criteria;
        activating second at least one system hook that identifies when a thread is entering the program unit; and
        activating third at least one system hook that identifies when a thread is exiting the program unit, the second at least one system hook and third at least one system hook being embedded in linkage code for executing calls and returns between program units of the computer application program code;
    determining, with the second at least one system hook and based on the registration details stored in the code coverage registration entry and the updated operating system data structures including the updated at least one entry in the system program table, and independent of instrumentation within the computer application program code, that a thread has entered the program unit that has been selected for recording an execution of an instruction in the set of instructions in the program unit;
    determining, based on the registration details stored in the code coverage registration entry and on the determination that the thread has entered the program unit, whether the thread is associated with at least one attribute that matches the set of thread recording criteria; and
    at least one of dynamically activating and deactivating, in response to determining whether the at least one attribute of the thread matches the set of thread recording criteria and that the thread is in the program unit, an instruction recording mechanism for the thread, a dynamically activated instruction recording mechanism using the start address stored in the at least one entry in the system program table and the instruction address of a fetched instruction in the code of the program unit to index to a corresponding flag in the table comprising flags.

2. The method of claim 1, further comprising:
    recording, by the instruction recording mechanism in response to being activated, each instruction that has executed within the program unit.

3. The method of claim 2, wherein the recording comprises:
    determining that an instruction has been executed within the program unit;
    identifying a flag within the table comprising flags that corresponds to the instruction that has been executed; and
    changing a value of the flag that has been identified to indicate that the instruction has been executed.

4. The method of claim 2, where a value of each flag indicates a number of times a corresponding instruction has been executed, and wherein the recording comprises:

determining that an instruction has been executed within the program unit;

identifying a flag within the table comprising flags that corresponds to the instruction that has been executed; and incrementing the value of the flag that has been identified to indicate that the instruction has been executed.

5. The method of claim 1, wherein the instruction recording mechanism is a hardware assisted instruction recording mechanism.

6. The method of claim 1, further comprising:

determining that the program unit has been registered for code coverage collection by a user, wherein the at least one of dynamically activating and deactivating the instruction recording mechanism for the thread is further in response to the program unit being registered for code coverage collection.

7. The method of claim 1, wherein the set of thread recording criteria is defined by a user.

8. The method of claim 1, wherein the dynamically activating comprises:

setting a hardware event facility address range for the program unit.

9. The method of claim 8, further comprising:

determining that an instruction associated with an address within the hardware event facility address range has been executed;

generating, in response to instruction being executed, a hardware event facility interrupt; and recording the execution of the instruction in response to the hardware event facility interrupt having been generated.

* * * * *